United States Patent
Plate

(10) Patent No.: US 9,558,017 B2
(45) Date of Patent: Jan. 31, 2017

(54) SOFTWARE DEPENDENCY MANAGEMENT THROUGH DECLARATIVE CONSTRAINTS

(71) Applicant: Henrik Plate, Valbonne (FR)

(72) Inventor: Henrik Plate, Valbonne (FR)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 14/218,555

(22) Filed: Mar. 18, 2014

(65) Prior Publication Data

US 2015/0268948 A1    Sep. 24, 2015

(51) Int. Cl.
G06F 9/44     (2006.01)
G06F 9/445    (2006.01)
G06F 21/57    (2013.01)

(52) U.S. Cl.
CPC ............ *G06F 9/44552* (2013.01); *G06F 8/70* (2013.01); *G06F 8/71* (2013.01); *G06F 21/577* (2013.01)

(58) Field of Classification Search
CPC ............ G06F 8/71; G06F 8/70; G06F 21/577; G06F 9/44552
USPC ...................................... 717/123; 726/25, 26
See application file for complete search history.

(56) References Cited

U.S. PATENT DOCUMENTS

| | | | |
|---|---|---|---|
| 7,434,202 B2 | 10/2008 | Kramer et al. | |
| 7,640,533 B1 | 12/2009 | Lottero et al. | |
| 7,895,572 B2 | 2/2011 | Stienhans et al. | |
| 7,899,798 B2 | 3/2011 | Williams et al. | |
| 7,984,426 B2 | 7/2011 | Loff et al. | |
| 8,201,157 B2 | 6/2012 | Wagner et al. | |
| 8,332,816 B2 | 12/2012 | Stienhans et al. | |
| 8,464,222 B2 | 6/2013 | Bell et al. | |
| 8,621,417 B2 | 12/2013 | Kaulgud et al. | |
| 8,782,554 B2 | 7/2014 | Kern et al. | |
| 2002/0053033 A1* | 5/2002 | Cooper et al. ................ 713/201 | |
| 2004/0168152 A1 | 8/2004 | Kramer et al. | |
| 2005/0005159 A1* | 1/2005 | Oliphant ............... G06F 21/577 726/26 |
| 2005/0039196 A1* | 2/2005 | Sasidharan ................... 719/331 | |
| 2005/0055315 A1* | 3/2005 | Darweesh ........... G06F 21/6209 705/59 |
| 2005/0172306 A1 | 8/2005 | Agarwal et al. | |
| 2006/0288420 A1* | 12/2006 | Mantripragada et al. ...... 726/25 | |
| 2012/0174068 A1 | 7/2012 | Gutfleisch et al. | |
| 2012/0198415 A1 | 8/2012 | Brandt et al. | |

(Continued)

OTHER PUBLICATIONS

Williams et al., "The Unfortunate Reality of Insecure Libraries", Aspect Security, Inc., Mar. 2012, 20 pages.

(Continued)

*Primary Examiner* — Viva Miller
(74) *Attorney, Agent, or Firm* — Brake Hughes Bellermann LLP

(57) ABSTRACT

In accordance with aspects of the disclosure, systems and methods are provided for managing software component dependencies for applications using declarative constraint definitions, including enabling specification of constraint definitions using a declarative language to analyze and detect software component dependencies on one or more libraries that meet certain criteria, identifying and checking software component dependencies on the one or more libraries that violate the constraint definitions, and implementing an algorithm for analyzing applications and resolving software component dependencies on the one or more libraries that violate the constraint definitions.

19 Claims, 8 Drawing Sheets

(56) References Cited

U.S. PATENT DOCUMENTS

2013/0091488 A1    4/2013  Koutyrine et al.

OTHER PUBLICATIONS

"Apache Ivy—The Agile Dependency Manager", retrieved from http://ant.apache.org/ivy/, Mar. 12, 2014, 4 pages.
"JSR-000315 Java Servlet 3.0 Final Release", retreived from http://download.oracle.com/otndocs/jcp/servlet-3.0-fr-eval-oth-JSpec/, Mar. 13, 2014, 1 page.
"OVAL—Open Vulnerability and Assessment Language", retrieved from http://oval.mitre.org/, Feb. 1, 2014, 1 page.
"Sonatype", retrieved from http://www.sonatype.com, Feb. 26, 2014, 2 pages.
"Application Health Check—Sonatype.com", retrieved from http://www.sonatype.com/Products/Insight-App-Health-Check, Jun. 3, 2013, 4 pages.
"National Vulnerability Database Version 2.2", retrieved from http://nvd.nist.gov/, Feb. 26, 2014, 2 pages.
"The Central Repository", downloaded from http://search.maven.org, retrieved on Aug. 31, 2015, 1 page.
"The Central Repository", downloaded from http://central.sonatype.org/, retrieved on Aug. 31, 2015, 3 pages.

\* cited by examiner

800

802 — enabling specification of constraint definitions using a declarative language to detect software component dependencies on one or more libraries that meet certain criteria 804 — identifying and checking software component dependencies on the one or more libraries that violate the constraint definitions 806 — implementing an algorithm for analyzing applications and resolving software component dependencies on the one or more libraries that violate the constraint definitions 808 — accessing a database and storing information related to the constraint definitions, the software component dependencies, and the algorithm for analyzing applications and resolving software component dependencies

FIG. 8

SOFTWARE DEPENDENCY MANAGEMENT THROUGH DECLARATIVE CONSTRAINTS

TECHNICAL FIELD

The present description relates to various computer-based techniques for software dependency management.

BACKGROUND

Software applications (e.g., Java™ applications) increasingly depend on libraries, provided either by the same organization or third parties. Studies show that approx. 80% of Java™ application code may belong to libraries, while approx. 20% of application code may be developed for given applications. In some developments, programming models may facilitate either inclusion of libraries in software packages at software development time, or reference of libraries may be loaded dynamically at software runtime. Some packaged applications may use libraries by either copying them into a dedicated folder at software development time, or by declaring a dependency that may be resolved by an application container at software runtime. Some software dependencies may be resolved and integrated into common development environments with a tool having access to software repositories that provide centralized access to versions of closed-source or open-source libraries.

This ease of access makes it difficult for developers to understand and control the use of libraries. In particular, dependency on one library creates nested dependencies on other libraries that are not necessarily known to an application developer interested in functionalities provided by an originally included library. As such, in these situations, it may be difficult for developers and application users to spot whether any of the libraries that are automatically downloaded and included at development or runtime is free of functional or non-functional (security) bugs. In conventional systems, it may be required to manually compare dependency reports with bug and security reports provided by library vendors or third-parties, e.g., vulnerability databases.

Further, there may be significant risk that application users unknowingly depend on buggy and vulnerable software libraries with potentially critical impact on an application functionality or security. Besides security, there may exist other reasons to better understand and control use of third-party libraries, e.g., a requirement to adhere to license terms imposed by some libraries that potentially affect various relevant licenses for some applications. As such, there exists a need to improve software dependencies in applications to thereby reduce the impact of buggy and vulnerable software libraries.

SUMMARY

In accordance with aspects of the disclosure, a computer system may be provided for software dependency management including instructions stored on a computer-readable medium and executable by at least one processor. The computer system may include a conflict resolution manager configured to cause the at least one processor to manage software component dependencies for applications using declarative constraint definitions. The conflict resolution manager may include a component analyzer configured to analyze and detect direct and transitive software component dependencies on one or more libraries. The conflict resolution manager may include a constraint checker configured to enable specification of constraint definitions using a declarative language, and to identify and check software component dependencies for one or more libraries that violate the constraint definitions. The conflict resolution manager may include an optimizer configured to implement an algorithm for analyzing applications and resolving software component dependencies on the one or more libraries that violate the constraint definitions. The conflict resolution manager may include a storage handler configured to access a database and store information related to the constraint definitions, the software component dependencies, and the algorithm for analyzing applications and resolving software component dependencies.

In accordance with aspects of the disclosure, a computer program product may be provided for software dependency management. The computer program product may be tangibly embodied on a non-transitory computer-readable storage medium and include instructions that, when executed by at least one processor, may be configured to manage software component dependencies for applications using declarative constraint definitions. The instructions may be configured to enable specification of constraint definitions using a declarative language to analyze and detect software component dependencies on one or more libraries that meet certain criteria. The instructions may be configured to identify and check software component dependencies on the one or more libraries that violate the constraint definitions. The instructions may be configured to implement an algorithm for analyzing applications and resolving software component dependencies on the one or more libraries that violate the constraint definitions. The instructions may be configured to access a database and store information related to the constraint definitions, the software component dependencies, and the algorithm for analyzing applications and resolving software component dependencies.

In accordance with aspects of the disclosure, a computer-implemented method may be provided for software dependency management. The method may include managing software component dependencies for applications using declarative constraint definitions. The method may include enabling specification of constraint definitions using a declarative language to analyze and detect software component dependencies on one or more libraries that meet certain criteria. The method may include identifying and checking software component dependencies on the one or more libraries that violate the constraint definitions. The method may include implementing an algorithm for analyzing applications and resolving software component dependencies on the one or more libraries that violate the constraint definitions. The method may include accessing a database and storing information related to the constraint definitions, the software component dependencies, and the algorithm for analyzing applications and resolving software component dependencies.

The details of one or more implementations are set forth in the accompanying drawings and the description below. Various other features will be apparent from the description and drawings, and from the claims.

BRIEF DESCRIPTION OF THE DRAWINGS

FIG. 8 is a process flow illustrating an example method for software dependency management, in accordance with aspects of the disclosure.

DETAILED DESCRIPTION

Figure 1:
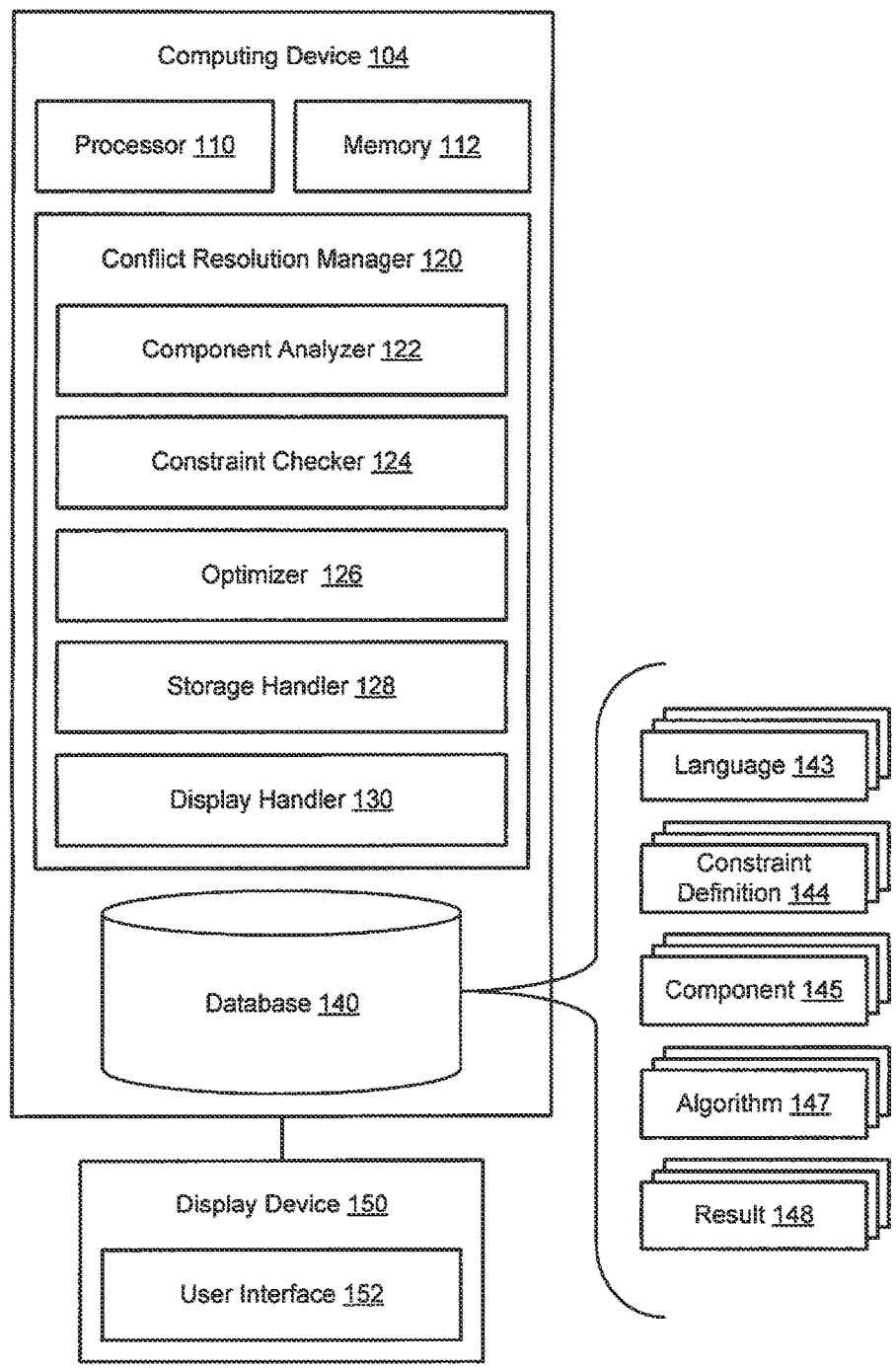
FIG. 1 is a block diagram illustrating an example system for software dependency management, in accordance with aspects of the disclosure.

FIG. 1 is a block diagram illustrating an example system 100 for software dependency management, in accordance with aspects of the disclosure.

In the example of FIG. 1, the system 100 comprises a computer system for implementing software dependency management associated with a computing device 104 (e.g., having at least one processor and memory), thereby transforming the computing device 104 into a special purpose machine designed to implement software dependency management process(es), as described herein. In this instance, the computing device 104 may include any standard element(s) and/or component(s), including at least one processor(s) 110, memory 112 (e.g., non-transitory computer-readable storage medium), one or more database(s) 140, power, peripherals, and various other computing elements and/or components that may not be specifically shown in FIG. 1. Further, the system 100 may be associated with a display device 150 (e.g., a monitor or other display) that may be used to provide a user interface (UI) 152, such as, in some examples, a graphical user interface (GUI). In some examples, the display 150 includes a touch screen display. In some examples, the UI 152 may be used to receive preferences from a user for managing, administering, and/or utilizing the system 100. As such, various other element(s) and/or component(s) of the system 100 that may be useful for purpose of implementing the system 100 may be added or included, as apparent to one of ordinary skill in the art.

In the example of FIG. 1, the software dependency management system 100 may include the computing device 104 and instructions stored on the non-transitory computer-readable medium 112 and executable by the at least one processor 110. In some examples, the software dependency management system 100 may include the display device 150 for providing/displaying output to a user, and the display device 150 may include the UI 152 for receiving input from the user. In some examples, the output may include displaying user interactive regions, sections, or areas.

In various example implementations, aspects of the disclosure are related to software dependency management through declarative constraint definitions using, for example, a declarative language. For instance, aspects of the disclosure are related to a declarative language, process, and tool to specify and check constraints on the use and composition of fine-granular software libraries in composite applications. In various examples, libraries may be referred to as library components, and applications may be referred to as application components.

In some examples, software applications may increasingly depend on third-party software libraries, which may depend on other libraries and so forth. While software reuse may be desirable, software reuse may come with certain risks, e.g., a risk to include or depend on vulnerable library versions that endanger application security, or a risk to use libraries with potentially conflicting license terms. In some other examples, software tools of the disclosure may be configured to support resolution of software dependencies at development or runtime, and software tools of the disclosure may be configured to support constraining and/or checking the use of libraries that meet generic criteria specified over meta-data describing nested software archives.

Further, aspects of the disclosure are related to a declarative language to express software component dependencies and to specify constraints for use of software libraries. Still further, aspects of the disclosure are related to a process and/or algorithm configured to resolve software dependencies in an iterative manner, check any violation of constraints, and/or propose corrections to dependency declarations. Moreover, aspects of the disclosure are related to a tool and/or architecture that is configured to implement an algorithm, and the use of which may be exemplified with several use-cases.

In reference to constraints, the declarative language may be used to allow or enable specification (and/or combination) of constraints regarding the use of software components and dependency relationships among software components. For instance, in some examples, multiple (e.g., three) different kinds or types of constraints may be supported. Further, various property constraints may allow for or enable constraining use of software components with certain properties. In other examples, various dependency constraints may allow for constraining dependency of software components with certain properties on other components with certain properties. In still other examples, various composition constraints may allow for constraining the use of software components with certain properties in a same context (e.g., if and when ignoring dependency hierarchy).

In the example of FIG. 1, the software dependency management system 100 may include a conflict resolution manager 120 configured to cause the at least one processor 110 to manage components 145 including software component dependencies for applications using declarative constraint definitions 144. The components 145 may include information about components, including both properties (e.g., vendor, name, release) as well as dependency information, such as, for example, information described by a manifest written in the declarative language. The components 145 may also include information about one or more libraries (including library components) and/or one or more applications (including application components).

In some implementations, the conflict resolution manager 120 may be configured to use a declarative language that allows specification of constraints (checks) to analyze and detect dependencies on one or more libraries, such as, for instance, undesired libraries (i.e., libraries that meet certain criteria). The conflict resolution manager 120 may be configured to implement various process(es) and algorithm(s) to identify and possibly correct dependencies on libraries (software components) that violate constraints. In some implementations, identification of one or more or all component dependencies may be performed first, and then a check may be performed to determine whether one or more or any of them violate constraints or not. The conflict resolution manager 120 may be configured to provide an architecture for tool(s) that implement an algorithm to check various applications and which support various use-cases. In some examples, the architecture may be considered generic in the sense that some software components may be presented without prescribing their implementation technologies, communication protocols, and/or distribution.

In the example of FIG. 1, the conflict resolution manager 120 may include a component analyzer 122 configured to cause the at least one processor 110 to analyze and detect software component dependencies 145 (including, e.g., direct and transitive software component dependencies) on one or more libraries (including, e.g., one or more software libraries). In some implementations, the model and declarative language used for describing dependencies may not make a difference between various components including, e.g., software libraries, software components, and/or software applications, where each may be considered a component. Further, libraries may be referred to as library components, and applications may be referred to as application components.

In some implementations, the declarative language 143 may be used to specify (and/or combine) constraints regarding use of software components and/or dependency relationships among the software components. In various examples, multiple (e.g., three) different constraint types may be supported, and various property constraints may be used to constrain use of software components with certain properties. Further, dependency constraints may be used to constrain dependency of software components with certain properties on other components with certain properties, and composition constraints may be used to constrain use of software components with certain properties in a same context (e.g., if and when ignoring dependency hierarchy).

In some implementations, the component analyzer 122 may be configured to use the declarative language to express software component dependencies and to specify constraint definitions for use of the one or more libraries including one or more software libraries. Further, in some examples, the declarative language may provide for specifying declarative constraint definitions to analyze and detect software component dependencies on one or more libraries that meet certain criteria, whereby the certain criteria are applies to properties of respective libraries and to a manner in which multiple libraries are composed within a given application.

In some implementations, the component analyzer 122 may be configured to use the declarative language 143 to analyze and/or describe software component dependencies 145 and to specify constraint definitions 144 for use of the one or more libraries. For instance, component dependencies may be analyzed and described using the declarative language 143, and further, the declarative language 143 may be used to describe constraints. Moreover, as described herein, the declarative language 143 may be used for specifying and/or writing declarative constraint definitions 144 (i.e., enabling specification of constraint definitions) to analyze and detect (i.e., find, locate, discover, identify, determine, etc.) one or more or all software component dependencies 145 on the one or more libraries that meet certain criteria.

In some implementations, the component analyzer 122 may be configured to use the declarative language 143 to analyze and detect software component dependencies 145 on the one or more libraries that meet certain criteria including a library having licensed library components. Further, in other implementations, the component analyzer 122 may be configured to use the declarative language 143 to analyze and detect various software component dependencies 145 on the one or more libraries that meet certain criteria including a library of a specific version having licensed library components. Still further, in some implementations, the component analyzer 122 may be configured to use the declarative language 143 to analyze and detect various software component dependencies 145 on the one or more libraries that meet certain criteria including a library having a specific digest that does not correspond to its original digest communicated by its original vendor.

Further, in some implementations, the component analyzer 122 may be configured to use the declarative language 143 to analyze and detect software component dependencies 145 on the one or more libraries that meet certain criteria including one or more of being published under a certain license, a library of a specific version having licensed library components, and a library having a specific digest that may not correspond to its original digest communicated by its original vendor.

In the example of FIG. 1, the conflict resolution manager 120 may include a constraint checker 124 configured to cause the at least one processor 110 enable specification of constraint definitions using a declarative language, and to identify and check software component dependencies 145 on the one or more libraries that violate the constraint definitions 144. In some implementations, the constraint checker 124 may be configured to process and correct one or more of the software component dependencies 145 on the one or more libraries that violate the constraint definitions 144. Further, in some implementations, the constraint checker 124 may be configured to identify and check software component dependencies 145 in an iterative manner, check for violation of constraint definitions 144, and/or propose corrections to dependency declarations using, e.g., the declarative language 143. Still further, in various other implementations, identification of one or more or all component dependencies may be performed, and then a check may be performed to determine whether one or more or any of them violate constraints or not.

In the example of FIG. 1, the conflict resolution manager 120 may include an optimizer 126 configured to cause the at least one processor 110 to implement an algorithm 147 for analyzing applications and/or resolving software component dependencies 145 on the one or more libraries that may violate the one or more constraint definitions 144. In some implementations, the optimizer 126 may be configured to implement a software tool having an architecture that may be configured to implement the algorithm 147. Further, the architecture for the software tool may be configured to implement the algorithm 147 to check the applications for specific use-cases in which software components 145 are presented without prescribing at least one of their implementation technologies, communication protocols, and/or distribution.

Further, in the example of FIG. 1, results 148 may summarize constraint violations found during component analysis, as well as various corrections performed (if any). Result information may be represented in various formats as to support alerting and monitoring functionality using various devices and communication channels.

In the example of FIG. 1, the conflict resolution manager 120 may include a storage handler 128 configured to cause the at least one processor 110 to access one or more databases (e.g., one or more database 140) and store data and information related to one or more of the constraint definitions 144, the software component dependencies 145, and the algorithm 147 for analyzing the applications and resolving the software component dependencies 145. Therefore, in various examples, the storage handler 128 may be configured to cause the at least one processor 110 to store data and information related to one or more of the libraries, the declarative language 143, the constraint definitions 144, the software component dependencies 145, the applications, and the algorithm 147 including the software tool and architecture for the software tool. In some examples, libraries may be referred to as library components, and applications may be referred to as application components.

In the example of FIG. 1, the conflict resolution manager 120 may include a display handler 130 configured to cause the at least one processor 110 to display data and information related to one or more of the constraint definitions 144, the software component dependencies 145, and the algorithm 147 for analyzing the applications and resolving the software component dependencies 145. Thus, in various examples, the display handler 130 may be configured to cause the at least one processor 110 to display data and information related to one or more of the libraries, the declarative language 143, the constraint definitions 144, the software component dependencies 145, the applications, and the algorithm 147 including the software tool and architecture for the software tool.

In an implementation, the software dependency management system 100 may include one or more databases 140 configured to store various information related to software dependency management. For example, the database(s) 140 may be configured to store data and information related to one or more of the constraint definitions 144, the software component dependencies 145, and the algorithm 147 for analyzing applications and resolving software component dependencies 145.

Therefore, in various examples, the database(s) 140 may be configured to store data and information related to the one or more libraries, including various data and information related to one or more software libraries having software components, one or more libraries having licensed library components, one or more libraries of a specific version having licensed library components, and one or more libraries having at least one specific digest that does not correspond to its original digest communicated by its original vendor. Further, in various examples, the database(s) 140 may be configured to store data and information related to one or more of the libraries, the declarative language 143, the constraint definitions 144, the software component dependencies 145, the applications, and the algorithm 147 including the software tool and architecture for the software tool.

In reference to the example of FIG. 1, it should be appreciated that the software dependency management system 100 is illustrated using functional blocks or modules that represent more-or-less discrete functionality. However, such illustration is provided for clarity and convenience, and thus, the various functionalities may overlap or be combined within a described block(s) or module(s), and/or may be implemented by one or more block(s) or module(s) not specifically illustrated in FIG. 1. Therefore, in some examples, conventional functionality that may be considered useful to the system 100 of FIG. 1 may be included as well even though such conventional elements are not illustrated explicitly, for the sake of clarity and convenience.

In some implementations, the conflict resolution manager 120 may be configured to cause the at least one processor 110 to manage software component dependencies 145 for building one or more additional software versions of the applications, where a manifest file may be rewritten to avoid a design-time dependency on software components that violate the constraint definitions.

In some implementations, the conflict resolution manager 120 may be configured to cause the at least one processor 110 to manage software component dependencies 145 for deployment of the applications, where in one example, in case of static dependency violations, deployment of the applications may be suspended, and an error message may be displayed to a user. In another example, in case of dynamic dependency violations, reported constraint violations may be used to resolve dynamic dependencies to avoid violations.

In some implementations, the conflict resolution manager 120 may be configured to cause the at least one processor 110 to manage software component dependencies 145 for protecting the applications in a run-time environment, where in one example, the applications may be scanned for run-time dependencies on software components 145 that violate the constraint definitions 144. In another example, in case of run-time dependency violations, one or more actions may be performed including one or more of displaying a warning message to a user, termination of the applications, and/or constrained execution of the applications.

In some implementations, the conflict resolution manager 120 may be configured to cause the at least one processor 110 to manage software component dependencies 145 for licensing the applications, where library checks including software dependency checks may be performed at one or more of deployment time, application run-time, and/or a time that a user subscribes to at least one of the applications.

In accordance with aspects of the disclosure, the system and methods of the disclosure are related to allowing various entities (e.g., application developers, platform owners, end-users, and other stakeholders) to detect, inhibit, prevent, and/or suspend usage of software that may not meet their specific requirements (e.g., constraints). In some implementations, aspects of the disclosure provide a declarative language that may be configured to allow specification of constraints (e.g., checks) to detect dependency on undesirable libraries, e.g., libraries that may meet certain criteria. Example checks may be supported by the declarative language as follows.

For instance, an example check may determine whether an application makes use of a library that is licensed under AGPL (Affero General Public License) license terms, which may be specified and used by some application developers to inhibit or prevent their application from being infected by this kind of license. Another example check may determine whether an application makes use of a library X, version Y (e.g., perhaps known to contain a critical bug), which may be specified and provided by software vendors or vulnerability databases, and used by application users to inhibit or prevent execution of buggy or insecure applications. Another example check may determine whether an application makes use of the library X, version Y, but its MD5 digest may not correspond to original digest Z communicated by its vendor, which may be specified to prevent the use of incorrect, potentially manipulated libraries. In various examples, libraries may be referred to as library components, and applications may be referred to as application components.

In some implementations, aspects of the disclosure provide processes and algorithms to identify and, if possible, correct dependencies on libraries (e.g., software components) that may violate constraints. Further, aspects of the disclosure provide an architecture for tools implementing algorithms to check given applications that supports various use-cases. In some examples, tool architecture for the tools may be considered generic in a sense that some major components may be presented without prescribing their implementation technologies, communication protocols, and/or distribution.

In some implementations, the declarative language may be configured with a description of properties and dependencies of a given software component in a manifest. The declarative language may be configured with a definition of constraints on use and combination of components in context of a given application. In reference to the constraints, the declarative language may be configured to enable specification (and/or combination) of constraints regarding use of software components and dependency relationships among software components. For instance, multiple (e.g., three) different types of constraints may be supported, and various property constraints may provide for constraining use of software components with certain properties. Further, dependency constraints may provide for constraining dependency of software components with certain properties on other components with certain properties. Still further, composition constraints may allow for constraining use of software components with certain properties in a same context (e.g., if and when ignoring the dependency hierarchy). The language elements serving these purposes are described in greater detail herein.

In some implementations, the manifest may be configured to describe properties of software components, such as name, vendor, and/or license. The manifest may be configured to describe dependencies of one or more software components on one or more other components. Such dependencies may be declared with some degree of flexibility, e.g., regarding a required version number.

While manifest files exist in various types for different technologies, the declarative language is technology independent and may be used to declare dependencies between software components following different programming models. The declarative language may distinguish between static dependencies, where a binding may happen at development time, and dynamic dependencies, where a declared dependency may be resolved by a runtime environment. In some implementations, the description of static dependencies may effectively result in the nesting of manifests.

For instance, EBNF notation (Extended Backus—Naur Form notation) of declarative language elements supporting the definition of manifests may be as follows:

COMP_TYPE: Denotes a technical type or programming model of a software component. Example types may include JAR (Java™ ARchive), WAR (Web application ARchive), OSGI™ (Open Services Gateway Initiative). In some examples, this list may be extended to cover other technologies.

PROPERTIES: Prescribes a structure of component properties (that may be an empty list indicated by { }).

PROPERTY: A property may be either a numeric (NUM_VAL) or string value (STR_VAL) assigned to a name, e.g., name="y").

PROP_ID: A property identifier, unique in a given manifest. It may be expected that some property identifiers are type-independent, e.g., vendor or license, while other properties only exist for given component types (e.g., MainClass in case of executable Java™ Archives).

DEPENDS_ON: Indicates a dependency on one or multiple other software component (that may be an empty list indicated by { }). Dependencies may be combined in logical expressions by use of BOOL_OP to indicate alternative resolution options to a runtime environment, e.g., depends_on {y AND (u00 OR u01 OR u02)}.

DEP: Lists multiple (e.g., three) different ways of declaring a dependency.

STATIC_DEP: Indicates a static dependency of one component A on another component B, whereby B is bundled together with A, e.g., part of a same application bundle or package. In some examples, declaration of a static dependency allows specification of properties and further, nested dependencies of B.

DYN_DEP: Indicates a dynamic dependency of one component A on another component B, whereby executable code of B may be only retrieved and used at runtime (late binding). In contrast to static dependencies, dynamic ones allow definition of property comparisons (through use of PROP_EXPR), e.g., to indicate that a set of component versions are acceptable. In some examples, dynamic depen-

```
MANIFEST     = "manifest" COMP_ID "type" COMP_TYPE "{" PROPERTIES DEPENDS_ON
               "}"
COMP_ID      = ALPHANUM
COMP_TYPE    = "war" | "jar" | "osgi" | "..."
PROPERTIES   = "properties" ( "{ }" | "{" PROPERTY { "," PROPERTY } "}" )
PROPERTY     = PROP_ID "=" ( NUM_VAL | STR_VAL )
PROP_ID      = ALPHANUM
DEPENDS_ON   = "depends_on" ( "{ }" | "{" DEP { BOOL_OP DEP } "}" )
DEP          = STATIC_DEP | DYN_DEP | REF
STATIC_DEP   = COMP_TYPE "static {" PROPERTIES DEPENDS_ON "}"
DYN_DEP      = COMP_TYPE "dynamic { property_expr" PROP_EXP { "," PROP_EXP } "}"
PROP_EXPR    = ( PROP_ID NUM_OP NUM_VAL) | ( PROP_ID STR_OP STR_VAL )
REF          = COMP_ID
BOOL_OP      = "and" | "or"
STR_OP       = "matches" | "=" | "!="
NUM_OP       = "<" | ">" | "=" | "<=" | ">="
DIGIT        = "0" | "1" | "2" | "3" | "4" | "5" | "6" | "7" | "8" | "9"
ALPHANUM     = "A" | "B" | ... | "Z" | "a" | "b" | ... | "z" |
DIGIT STRING = "" { ALL_CHAR } ""
STR_VAL      = STRING | "undefined"
NUM_VAL      = ( ["-"] { DIGIT } [","] { DIGIT } ) | "undefined"
ALL_CHAR     = UTF8
```

In some implementations, the non-terminal symbols of the declarative language may be configured with the following semantic:

MANIFEST: Prescribes an overall structure of a manifest.

COMP_ID: Identifier of a software component whose properties and dependencies may be described in the given manifest.

dencies do not allow a further, nested declaration of dependencies, since actual component (library) may be only known at runtime.

PROPR_EXPR: Allows specification of property comparisons, e.g., name="u", version>1.0.0, version<=1.2.0.

REF: Indicates a dependency on a component that may be defined in another manifest.

In some implementations, one or more non-terminal symbols BOOL_OP, STR_OP, NUM_OP, DIGIT, ALPHANUM, NUM_VAL, STR_VAL, and ALL_CHAR may be used to describe and compare string and numeric property values. The EBNF notation (Extended Backus-Naur Form notation) for these symbols may be considered trivial and may not be completed within the scope of this document.

As described herein, aspects of the disclosure provide:

(1) a declarative language configured to express software component dependencies and to specify constraints for the use of software libraries, (2) a process and algorithm configured to resolve software dependencies in an iterative manner, check violation of constraints, and/or propose corrections to the dependency declaration, and (3) a tool and a related architecture configured to implement the algorithm, whose use is exemplified with one or more or several use-cases.

Figure 2:
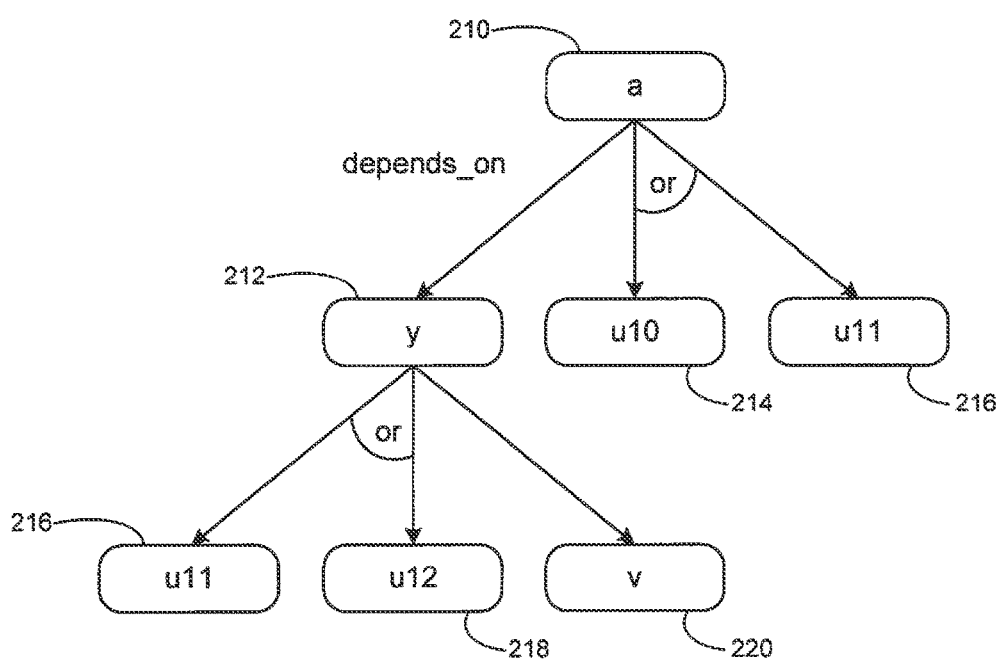
FIG. 2 is a block diagram illustrating an example dependency hierarchy for software dependency management, in accordance with aspects of the disclosure.

FIG. 2 is a block diagram illustrating an example dependency hierarchy 200 for software dependency management, in accordance with aspects of the disclosure.

In some implementations, in reference to the example of FIG. 2, the example dependency hierarchy 200 may relate to example manifests as follows:

For example, software component "a" 210 may include one or more (e.g., three) properties (e.g., name, release, and md5), which may depend statically on a JAR component "y" 212, version "z", which itself may depend dynamically on one or more OSGI™ components "u", such as u10 214 or u11 216, and "v" 220 dynamically dependent on component "u" u11 216 or u12 218 (e.g., with different versions).

```
manifest a type war {
    properties {name = "x", release = "y", md5 ="12341234" }
    depends_on jar static {
        properties {name = "y", release = "z"}
        depends_on osgi dynamic {
            property_expr {name = "u", release > "1.0", release <= "1.2"}
        } and osgi dynamic {
            property_expr {name = "v", release = "1.0" }
        }
    } and jar dynamic {
        property_expr {name = "u", release >= "1.0", release < "1.2"}
    }
}
```

In another example, six manifests whereby static dependency from the previous example may have been moved to a dedicated manifest, and the two dynamic dependencies may have been resolved (assuming that software component "u" may have at least releases 1.0, 1.1 and 1.2).

```
manifest a type war {
    properties {name = "x", release ="y", md5 = "12341234"}
    depends_on { y AND ( u10 OR u11) }
}
manifest y type jar {
    properties {name = "y", release = "z"}
    depends_on { (u11 or u12) and v }
}
manifest u10 type osgi {
    properties {name = "u", vendor = "ASF", release = "1.0"}
    depends_on { }
}
manifest u11 type osgi {
    properties {name = "u", vendor = "ASF", release = "1.1"}
    depends_on { }
}
manifest u12 type osgi {
    properties {name = "u", vendor = "ASF", release = "1.2"}
    depends_on { }
}
manifest v type osgi {
    properties {name = "v", vendor = "ASF", release = "1.0"}
    depends_on { }
}
```

In the example of FIG. 2, note that the dependency hierarchy 200 of cross-referencing manifest files may be represented as a tree whose root corresponds to a manifest file of a software component under analysis, and whose leafs correspond to manifest files without further dependencies. Further, in the example of FIG. 2, note that the "depends_on" relation may be considered transitive.

In some implementations, in reference to the constraints, the declarative language may be configured to allow specification (and/or combination) of constraints regarding the use of software components and dependency relationships among software components. In various examples, multiple (e.g., three) different kinds of constraints may be supported. For example, various property constraints may allow for constraining the use of software components with certain properties. In another example, various dependency constraints may allow for constraining the dependency of software components with certain properties on other components with certain properties. In another example, various composition constraints may allow for constraining the use of software components with certain properties in a same context (e.g., if and when ignoring the dependency hierarchy).

In some implementations, the EBNF notation of the declarative language elements supporting the definition of constraints may be as follows:

```
CONSTRAINT  = "constraint" CONSTR_ID
              [ "description" STRING ]
              [ "prio" DIGIT ]
              { "tag" STRING }
              { REF }
              "type" ( "all" | COMP_TYPE { COMP_TYPE } )
              CONSTR_DEF
CONSTR_ID   = STRING
CONSTR_DEF  = PROPSEL [ ("depends_on" | "used_with")
              PROPSEL]
PROPSEL     = "property" "{" PROP_EXPR
              { BOOL_OP PROP_EXPR } "}"
REF         = "ref" ["title" STRING] "url" STRING
```

The non-terminal symbols of the language have the following semantic:

CONSTRAINT: Prescribes an overall structure of a constraint definition including a number of mandatory and/or optional elements, namely:
  a constraint identifier,
  a description (optional),
  a priority (optional),
  one or more tags (optional),
  one or more references to external information sources relevant for a given constraint (optional),
  a type of component for which a constraint may be applicable, and
  a definition of an actual constraint (CONSTR_DEF).

CONSTR_ID: Identifier of a constraint.

CONSTR_DEF: Represents an actual constraint, whereby property selectors (PROPSEL) may be used for identifying components. A property constraint may be realized by using just one property selector. Dependency and composition constraints may be realized by using two property selectors and a keyword "depends_on" and "used_with" respectively. If a Boolean expression that results from use of one or two property selectors evaluates to TRUE, a constraint may be considered violated, and if the Boolean expression evaluates to FALSE, the constraint may be considered met. In that context, both keywords "depends_on" and "used_with" correspond to a logical AND).

PROPSEL: Allows identification of components by comparison of one or more property values according to Boolean expressions.

REF: reference to an external information source (e.g., an entry in a vulnerability database).

Example constraints may be as follows:

In some implementations, constraint for use of an OSGI™ component with a certain name and release (e.g., that may be vulnerable).

```
constraint "com.sap.def.1" prio 1 tag "security" tag "Web service" type
    osgi property { name = "cxf-rt-transports-http" AND release = "2.5.2" }
```

In some implementations, constraint for use of an OSGI™ component that may include a wrong MD5 digest.

```
constraint "com.sap.def.2" prio 1 tag "integrity" type osgi property
    { name = "cxf-rt-transports-http" AND md5 != "12341234" }
```

In some implementations, constraint for use of a component (of any type) with certain licenses.

```
constraint "com.sap.def.3" prio 1 tag "license" type all property { license = "AGPL" OR
    license = "GPL" }
```

In some implementations, constraint for BSD licensed software that may depend on AGPL licensed software (e.g., to be checked for every pair of dependent components in a given application context).

```
constraint "com.sap.def.4" prio 2 tag "license" type all property
    { license = "BSD" }
depends_on
property { license = "AGPL" }
```

In some implementations, constraint for an application makes use of SAP components and components from vendor XYZ at the same time (e.g., to be checked for every pair of components in a given application context).

```
constraint "com.sap.def.5" prio 3 tags "other" type all
    property {vendor = "SAP" }
    used_with
    property {vendor = "XYZ" }
```

In some implementations, constraint violations are reported as follows:

```
VIOLATION =
    ( "property constraint" CONSTR_ID "violated by" COMP_ID) |
    ( "dependency constraint" CONSTR_ID
    "violated by" COMP_ID "," COMP_ID) |
```

-continued

```
    ( "composition constraint" CONSTR_ID
    "violated by" COMP_ID "," COMP_ID)
```

In some examples, constraint violations may include EBNF for constraint violations.

In some implementations, the non-terminal symbols of the declarative language may include the following semantic:

CONSTR_ID: Identifier of a constraint that may be violated.

COMP_ID: Identifier of one or more components that violate a constraint.

Figure 3:
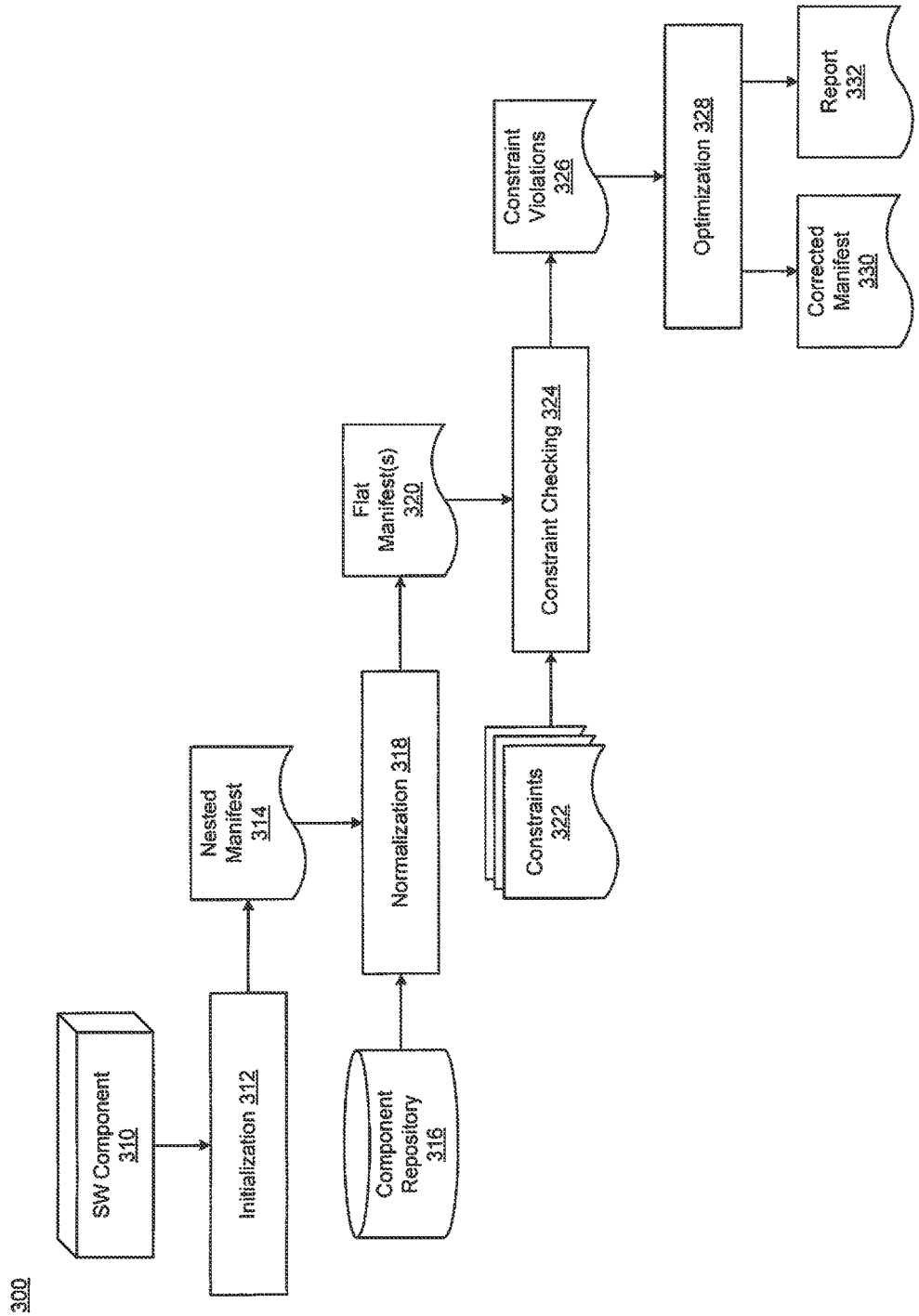
FIG. 3 is a block diagram illustrating an example multi-phase process for software dependency management, in accordance with aspects of the disclosure.

FIG. 3 is a block diagram illustrating an example process 300 for software dependency management, in accordance with aspects of the disclosure. In an example, the process 300 may include a constraint checking process. In some implementations, in reference to the process, the evaluation of a given software component to see whether it meets one or more constraints specified in the above-described declarative language may be realized in a multi-phase process (e.g., a four-phase process), whereby artifacts may be represented by the declarative language.

In the example of FIG. 3, the multi-phase constraint checking process 300 may include an initialization phase 312, a normalization phase 318, a constraint checking phase 324, and an optimization phase 328. In some examples, components of the multi-phase constraint checking process 300 may be coded as software modules and include instructions that are executable and executed processed by the at least one processor 110 of the computing device 104.

In some implementations, the initialization phase 312 may be configured to produce an initial, nested manifest file 314 by analyzing a given software (SW) component 310. In some implementations, the normalization phase 318 may be configured to transform the nested manifest file 314 into one or more, several, or set of flat manifest files 320 by externalizing static dependencies and resolving dynamic ones (on basis of component repositories 316).

In some implementations, the constraint checking phase 324 may be configured to check whether one or more, several, or set of constraints 322 are met or violated by the one or more, several, or set of flat manifest files 320 that resulted from the previous action or operation. This may result in the constraint checking phase 324 identifying, checking for, and/or determining one or more, several, or set of constraint violations 326. In some implementations, identification of one or more or all component dependencies may be performed first, and then a check may be performed to determine whether one or more or any of them violate constraints or not.

In some implementations, the optimization phase 328 may be configured to make an attempt or at least try to rewrite (e.g., reconcile, resolve, etc.) the one or more, several, or set of manifest files 320 in such a way that the constraint violations 326 are avoided, if possible. Further, the optimization phase 328 may be configured to generate one or more corrected manifests 330 and/or generate one or more reports 332 on result(s) of the entire process 300.

In some examples, production of intermediate manifest files in phases 312 and 318 may permit independent and repetitive execution of phases 318 and 324. While the initialization phase 312 may be executed only once for given software components, the normalization phase 318 and the constraint checking phase 324 may be executed in a repeated fashion to cover, e.g., new release levels relevant for resolution of one or more dynamic dependencies during the normalization phase 318, or new constraints to reflect discovery of new security vulnerabilities during the constraint checking phase 324. The phases 312, 318, 324, 328 of the process 300 including respective input(s) and output(s) of each phase 312, 318, 324, 328 are described in greater detail herein.

In the example of FIG. 3, the initialization phase 312 may refer to a first phase of the multi-phase constraint checking process 300 that may be performed by the conflict resolution manager 120 and/or a component thereof, such as, for example, the component analyzer 122. In the first phase 312, the software component 310 under evaluation (input) may be analyzed to build the nested manifest 314 (output), the latter being characterized by a presence of nested static and dynamic dependencies (e.g., as described in reference to FIG. 2). In some examples, the software component 310 may be represented by nested archive files or a file system directory, and the software component 310 may be recursively analyzed to find, locate, check for, and/or determine one or more dependencies of various types.

In some implementations, manifest creation may be achieved on a basis of type-specific templates that may determine various properties to be written into the manifest. This approach/technique may provide/allow for skipping irrelevant properties and mapping of type-specific property names to common names applicable to one or more or all component types (e.g., version to release). Further, properties whose values cannot be determined may be set to undefined (e.g., in case a Java™ manifest file does not comprise vendor information). In some examples, other properties, e.g., checksums or digests, may be computed on the fly, such as during process execution.

In an example of Web application ARchives (WAR), the initialization phase 312 may include examination of Java™ manifest files contained in a dedicated folder META-INF, including an analysis of one or more or all standard Java™ ARchives (JAR) contained in a folder WEB-INF/lib.

The following is a list of exemplary software component types (potential values of COMP_TYPE) that may be subject to analysis:
JAR: Java™ ARchive,
EAR: Enterprise ARchive (Java™),
WAR: Web application ARchive (Java™),
RAR: Resource Adapter aRchive (Java™),
OSGI™ bundles: Packaged as JAR with extra manifest headers,
RPM (compiled) and SRPM (source): File formats of the RPM Package Manager (RPM),
DEB: File format for Debian software packages, and
DLL: Dynamic-Link Library.

In some examples, identification of static and dynamic dependencies may differ between one or more or all of these example types, where for instance, the initialization phase 312 may require type-specific analysis modules.

In the example of FIG. 3, the normalization phase 318 may refer to a second phase of the multi-phase constraint checking process 300 that may be performed by the conflict resolution manager 120 and/or a component thereof, such as, for example, the component analyzer 122. In the second phase 318, the nested manifest 314 (input) may be transformed into a set of flat manifests 320 (output), which may be achieved by flattening of static dependencies, and/or by resolution of dynamic dependencies.

In some implementations, property and dependency declarations of static dependencies may be put into a separate manifest, and a formerly static dependency may be replaced by a reference to this new manifest (e.g., referring to FIG. 2, the dependency of component "a" on component "y").

In some implementations, declaration of dynamic dependencies may be replaced by a reference to separate manifests, whereby release ranges may be resolved by interacting with internal and/or third-party software repositories. For example, in some instances, each actual version in a specified range may be provided its own manifest (e.g., referring to FIG. 2, the dependency of component "a" on component "u").

In some implementations, resolution of dynamic dependencies may occur iteratively, whereby component after component may be downloaded and examined until no dynamic dependencies exist any longer. Implementation of the normalization phase 318 may be configured to optimize this process by creating a cache of manifest files for common libraries (e.g., instead of repeatedly downloading and examining components multiple times, over and over again).

In some examples, dependency hierarchy resulting from the normalization phase 3185 may not be restricted to a single component type (COMP_TYPE). For instance, a Web application (WAR) may potentially depend on a JAR, which itself may depend on a particular Windows component.

In the example of FIG. 3, the constraint checking phase 324 may refer to a third phase of the multi-phase constraint checking process 300 that may be performed by the conflict resolution manager 120 and/or a component thereof, such as, for example, the constraint checker 124. In the third phase 324, the flat manifest files 320 (input) may be evaluated to determine whether they meet or violate a given set of constraint definitions 322 (input). The result may include a set of constraint violations 326 (output). In some examples, the constraint checking phase 324 may occur on a basis of one or more or several sets and elementary Boolean functions, which may be defined in the following.

In some implementations, a constraint may be met if a logical expression that results from specification of CONSTR_DEF evaluates to FALSE. In some other implementations, a constraint may be violated if a logical expression that results from specification of CONSTR_DEF evaluates to TRUE.

The following sets may be defined:

| Set | Description |
|---|---|
| $Ca = \{a, c1, c2, \ldots, cn\}$ | a and all software components that a depends on (directly or indirectly) according to the depends_on hierarchy of flat manifests |
| $Pa = \{(a, c1), (a, c2), \ldots (cn-1, cn)\}$ | All pairs of software components in Ca |
| $Da = \{(a, c1), (a, c2), \ldots (a, cn)\}$ | All pairs of a and the components it depends on directly or indirectly (transitive) |
| $PCa = \{pc1, \ldots, pcn\}$ | Property, composition and |
| $CCa = \{cc1, \ldots, ccn\}$ | dependency constraints to be checked |
| $DCa = \{dc1, \ldots, dcn\}$ | for a given software component a |

In some implementations, a Boolean function may be used to evaluate component properties. The following function may be used to evaluate, whether a single property expression evaluates to TRUE or FALSE.

| Function | Description |
|---|---|
| PF: (x, p, op, v) → {0,1} | Returns the result of a comparison between the value of property p of component x with the constant value v, whereby op represents the comparison operator (metric, Boolean, or other). As such, the function implements a single property expression defined by PROP_EXPR. |

In some implementations, one or more Boolean functions may be used to check whether a constraint is met for a given component (or pair of 2 components). One or more of the following elementary functions may be used to check whether a constraint is met or violated for a given component (or a pair of two components).

| Function | Description |
|---|---|
| PCF: (x, pc) → {0,1} | Evaluates to true if the software component x violates the property constraint pc<br>Implemented by logically connecting all the PROP_EXPR specified in the PROPSEL of pc<br>PCF(x, pc) = pf(x, p1, opt v1) (AND \| OR) pf(x, pn, opn, vn) |
| DCF: (x, y, dc) → {0,1} | Evaluates to true if the dependency constraint dc is violated by the two software components x and y, whereby x directly or indirectly depends on y (i.e., (x,y) are element of Da)<br>DCF(x, y, dc) = pcf(x, pc1) AND pcf(y, pc2) whereby pc1 and pc2 represent the two property selectors PROPSEL declared for the dependency constraint dc |
| CCF: (x, y, cc) → {0,1} | Evaluates to true if the composition constraint cc is violated by the two software components x and y (i.e., (x,y) are element of Pa)<br>CCF(x, y, cc) = pcf(x, pc1) AND pcf(y, pc2) whereby pc1 and pc2 represent the two property selectors declared for the composition constraint cc |

In some implementations, a Boolean function may be used to check whether a constraint is met for sets of components (or pairs of components).

Further, in some implementations, while elementary functions may work on a level of single components (or pairs of components), the following functions may be used to check whether an entire set meets a given constraint. The functions may be implemented by a logical conjunction of the elementary functions defined in above table.

| Function | Description |
|---|---|
| PCF': (Ca, pc) → {0,1} | Evaluates to true if the property constraint pc is met by all elements of Ca<br>PCF'(Ca, pc) = PCF(a, pc) AND PCF(c1, pc) AND . . . AND PCF(cn, pc) |
| CCF': (Pa, cc) → {0,1} | Evaluates to true if the composition constraint cc is met by all elements of Pa<br>CCF'(Pa, cc) = CCF(a, c1, cc) AND CCF(a, c2, cc) AND ... CCF(cn-1, cn, cc) |
| DCF': (Da, dc) → {0,1} | Evaluates to true if the dependency constraint dc is met by all elements of Da<br>DCF'(Da, dc) = DCF(a, c1, dc) AND DCF(a, c2, dc) AND . . . DCF(a, cn, dc) |

In some implementations, a Boolean function may be used to check whether a component (with all its single components including pairs of components) meets a set of constraints.

Further, in some implementations, a Boolean function that checks whether a software component "a" meets one or more or all constraints comprised in PCa, CCa, and DCa may be as follows (implemented by a conjunction of previous functions).

| Function | Description |
|---|---|
| CF: (a, PCa, CCa, DCa) → {0,1} | Evaluates to true if the software component a meets all constraints comprised in PCa, CCa, and DCa<br>CF(a, PCa, CCa, DCa) =<br>PCF'(Ca, pc1) AND<br>PCF'(Ca, pc1) AND<br>CCF'(Pa, cc1) AND<br>CCF'(Pa, ccn) AND<br>DCF'(Da, dc1) AND<br>DCF'(Da, dcn) AND |

The building of complex evaluation functions out of more elementary ones may permit determining which software component (or pair of components) causes constraint violations (if any). The outcome of this phase may possibly be an empty set of constraint violations according to the declarative language, whereby each violation may indicate a constraint being violated as well as one or more components that cause(s) that violation. If a set of constraint violations is empty, then all constraints are met.

In the example of FIG. 3, the optimization phase 328 may refer to a fourth phase of the multi-phase constraint checking process 300 that may be performed by the conflict resolution manager 120 and/or a component thereof, such as, for example, the optimizer 126. In the fourth phase 328, an example purpose of this phase may be to check whether constraint violations 326 (input) may be avoided (or minimized) by rewriting/correcting manifest file(s) 330 (output). The optimization phase 328 may provide one or more reports 332 (output) that notify a user of the constraint violations 326 identified and corrections made (if any). In some examples, the one or more reports 332 may include a final report.

In some implementations, optimization may not be possible for static dependencies, where both components are tightly integrated at development time (e.g., a library JAR that is packaged together with the dependent Web application).

In some implementations, optimization may only be possible for dynamic dependencies, which are only declared at development time and resolved at installation or runtime. In fact, a constraint violation found for a dynamic dependency only represents a potential violation. The actual violation may only occur at runtime (if at all). Generally, the question whether a constraint violation caused by dynamic dependencies may be avoided depends on whether the dependency declaration refers to a set of alternatives (e.g., in reference to FIG. 2, component "y" depends on either "u11" or "u12"). In some examples, as long as at least one of these alternatives does not violate a constraint, the flat manifest file(s) 320 may be rewritten/corrected 330 so that dependencies on constraint-violating components are skipped.

In some instances, the optimization phase 328 may be implemented by iteratively constructing a Boolean expression out of all dependency relations declared in the flat manifest files 320. In these Boolean expressions, component identifiers represent Boolean variables, whereby a variable value of TRUE may indicate that the respective library may be used, while FALSE may indicate that it may not be used. The expression may be built starting from a root of the dependency hierarchy, and subsequent iterations replace variables according to the following rule: Given that a software component x has a declared dependency, an occurrence of x may be replaced by a conjunction of x' and the Boolean expression following its depends_on declaration.

The expression for the example outlined in the example of FIG. 2 may be built in one or more (e.g., three) iterations:

| 1. | Starting with a: | a | |
| --- | --- | --- | --- |
| 2. | Replacing a: | a' AND y | AND (u10 OR u11) |
| 3. | Replacing y: | a' AND (y' AND (u11 OR u12)) | AND (u10 OR u11) |

In some examples, this Boolean expression may represent at least one constraint in a classical Constraint Satisfaction Problem (CSP), in particular a Boolean satisfiability problem. If this expression evaluates to TRUE, all dependency requirements for software components are satisfied, i.e., the application may work.

The other CSP constraints may be constructed on a basis of all constraint violations detected in the constraint checking phase 324, where each constraint violation may thereby correspond to one CSP constraint according to the following rules:

In a first rule, a property constraint violation for component "a": NOT a (which may basically require that a corrected manifest does not include a dependency on "a", since it may violate a constraint).

In a second rule, a dependency constraint violation for components "a" and "b": NOT a OR NOT b (which may basically require that not both of components "a" and "b" may be present in a corrected manifest).

In a third rule, a composition constraint violation for components "a" and "b": NOT a OR NOT b (which may basically require that not both of components "a" and "b" may be present in a corrected manifest).

In some examples, a solution of a CSP problem may be given to a solver, which may try to find a combination of Boolean values in such a way that all CSP constraints evaluate to TRUE.

If that is possible, it may mean that all software requirements may be met while violations are avoided. The manifest file may be rewritten in such a way that all un-used libraries (whose variable value is FALSE) may be omitted from the manifest, e.g., by modifying a range of acceptable library versions.

If that is not possible considering all CSP constraints, a (non-trivial) goal may be to determine a largest subset of CSP constraints that may be satisfied. Further, a reasonable work-around may be to make use of categories and priorities to iteratively approach a subset of satisfiable CSP constraints. In some examples, a rule may assert that license constraints must be satisfied in any case, while security constraints with a particular priority (e.g., of less than 5) may be skipped.

Figure 4:
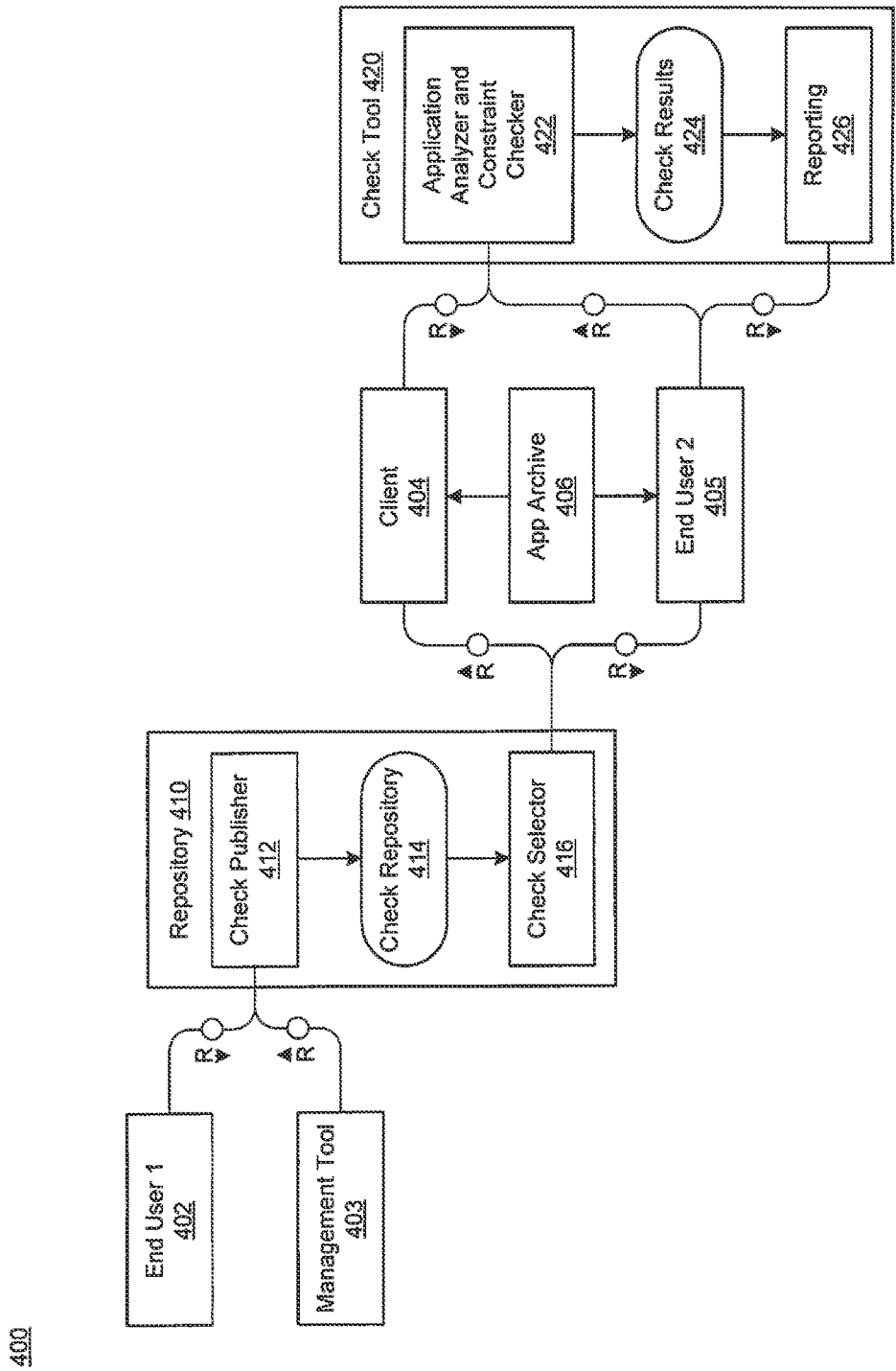
FIG. 4 is a block diagram illustrating an example tool architecture for software dependency management, in accordance with aspects of the disclosure.

FIG. 4 is a block diagram illustrating an example tool architecture 400 for software dependency management, in accordance with aspects of the disclosure.

The example of FIG. 4 outlines the architecture 400 for a tool that may be used for managing software dependency. The architecture 400 may include one or more building blocks including a repository 410 of constraints that may be filled and queried by a human agent and/or a software agent, and a check tool 420 that may be configured to implement the multi-phase constraint checking process 300 of FIG. 3, which may be used by a human agent or a software agent to perform checks for a given application.

In some implementations, the repository 410 and check tool 420 may be decoupled and may be operated by different organizations and run in remotely connected systems. Human and software agents may potentially use multiple (public or private) repositories to publish and read constraints that may be used by the check tool 420 for a given application. In some examples, public repositories may be used to store library constraints that are applicable in many contexts (e.g., in case of a vulnerability check) and may be accessible to a general public. In some other examples, private repositories may be used to store context-specific checks (e.g., ones that ensure adherence to a software vendor's specific license strategy or quality guidelines).

In the example of FIG. 4, the architecture 400 may include a first end user 402, such as, for example, a security researcher, software vendor, etc. The architecture 400 may include a management tool 403, such as, for example, bug tracking system(s), project management system(s), etc. The architecture 400 may include a client 404, such as, for example, an integrated development environment (IDE), a runtime environment, an application container, etc. The architecture 400 may include a second end user 405, such as, for example, an administrator, an auditor, etc.

In some implementations, a first group (Group 1) may include one or more stakeholders and components external to the repository 410 and the check tool 420. For instance, in some examples, the first end user 402 and the management tool 403 may represent human and software agents that publish library checks according to the above-described declarative language, in a public repository or a private repository. Further, in some examples, the client 404 and the second end user 405 may represent human and software agents that retrieve library constraints from a public repository or a private repository to check a given application archive. The architecture 400 may include an application archive 406 that may be configured to store/hold/keep one or more software components to be checked for constraint violations.

In some implementations, a second group (Group 2) may include one or more components of the constraint repository 410. In some examples, the architecture 400 may include a check publisher 412 that may include a human-computer interface (HCI) or service-interface that may be used by clients to upload constraints, validate their syntax/schema, and store correct checks in a check repository 414, which may include a database, such as a relational database or other facility that may be configured to store constraints. Further, in some other examples, the architecture 400 may include a check selector 416 that may include a human-computer interface (HCI) or service-interface that may be used by clients to retrieve constraints according to various search criteria, e.g., category and/or priority.

In some implementations, a third group (Group 3) may include one or more components of the check tool 420. In some examples, the architecture 400 may include an application analyzer and constraint checker 422 to implement the multi-phase constraint checking process 300 as described in reference to FIG. 3. In some examples, the architecture 400 may include check results 424 that may include a database or other facility that stores/holds/keeps a protocol of analysis runs performed by the tool. Further, in some examples, the checked application (input to the initialization phase 312) may be related to one or more of the list of identified constraint violations 326, various possible manifest corrections 330, and a human-readable report 332 (outputs of the constraint checking phase 324 and the optimization phase 328). In other examples, the architecture 400 may include reporting 426 that may include a human-computer interface (HCI) or service-interface that may be configured to provide access to the check results via, for example, data and information configured for display on a display and/or access to data and information stored in a database or other repository.

The following use-cases exemplify, on one hand, a benefit of the proposed solutions/approaches/techniques described herein, and on another hand, show a generality of the tool architecture 400. Differences between the use-cases concern a point in time at which constraints are checked (e.g., during development, deployment, and/or runtime), which may imply a focus on various different constraint categories. For instance, the development organization may be more interested in license compliance than end-users, who may likely be more concerned with security problems/issues.

Figure 5:
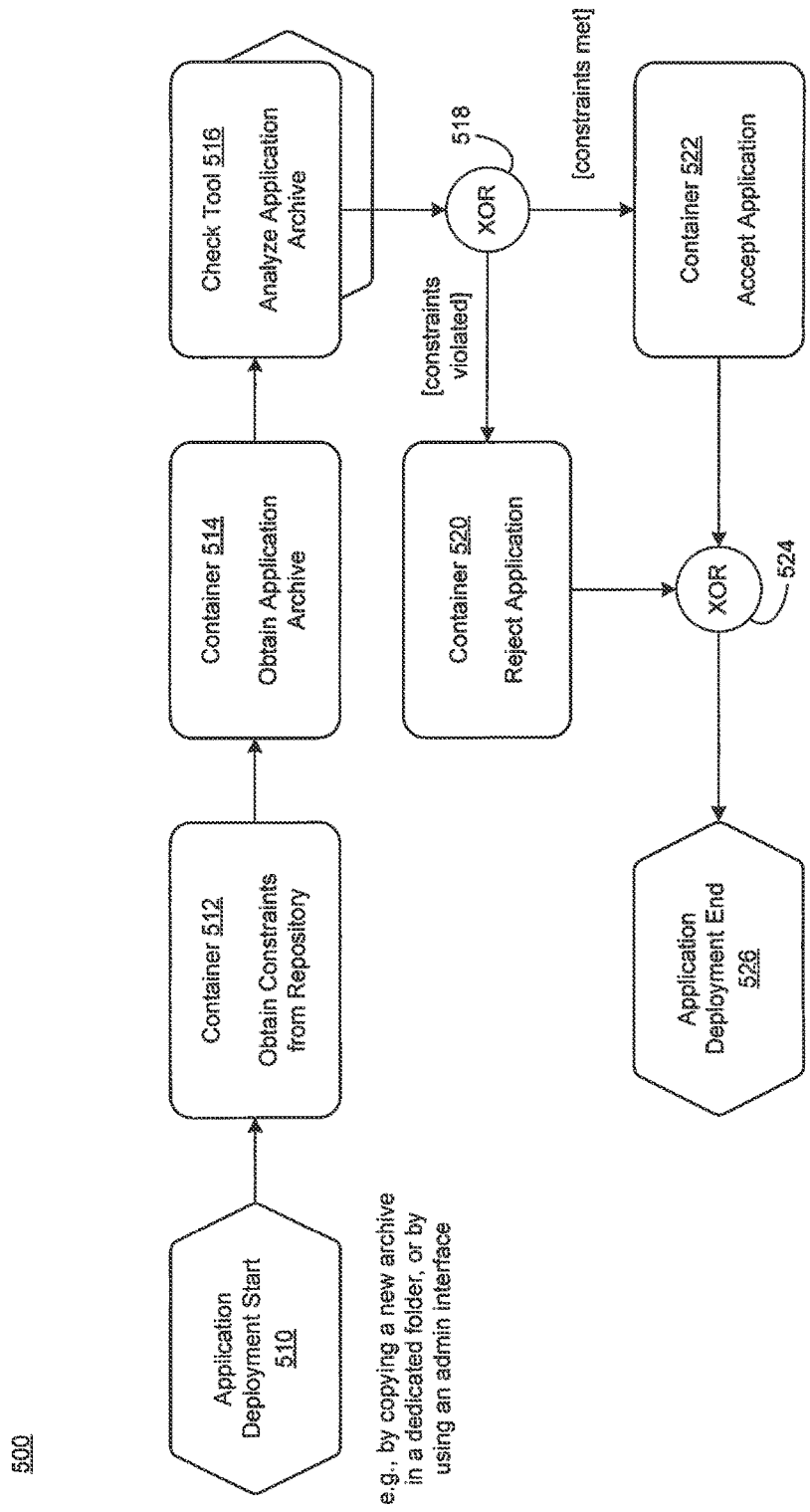
FIGS. 5-7 are block diagrams illustrating various example use-case flow charts, in accordance with aspects of the disclosure.
Figure 6:
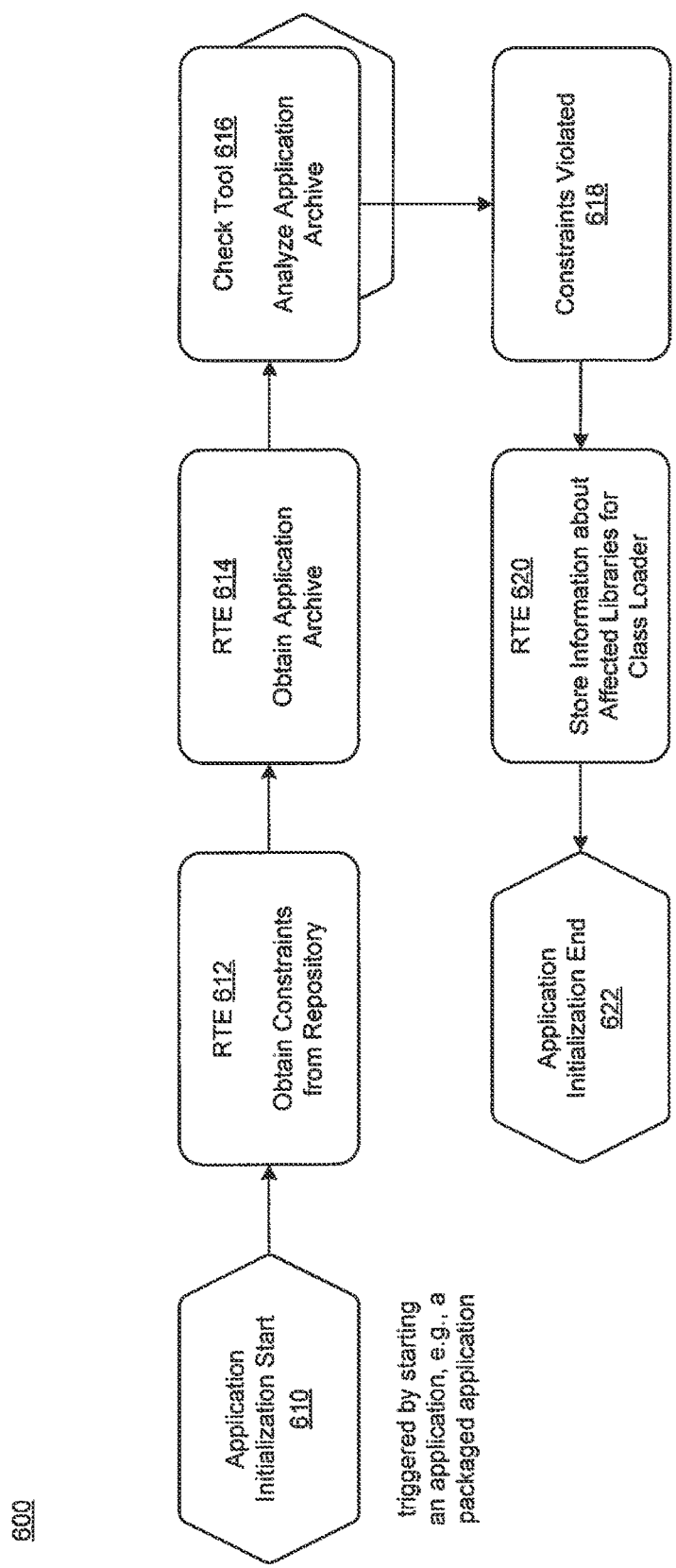
Figure 7:
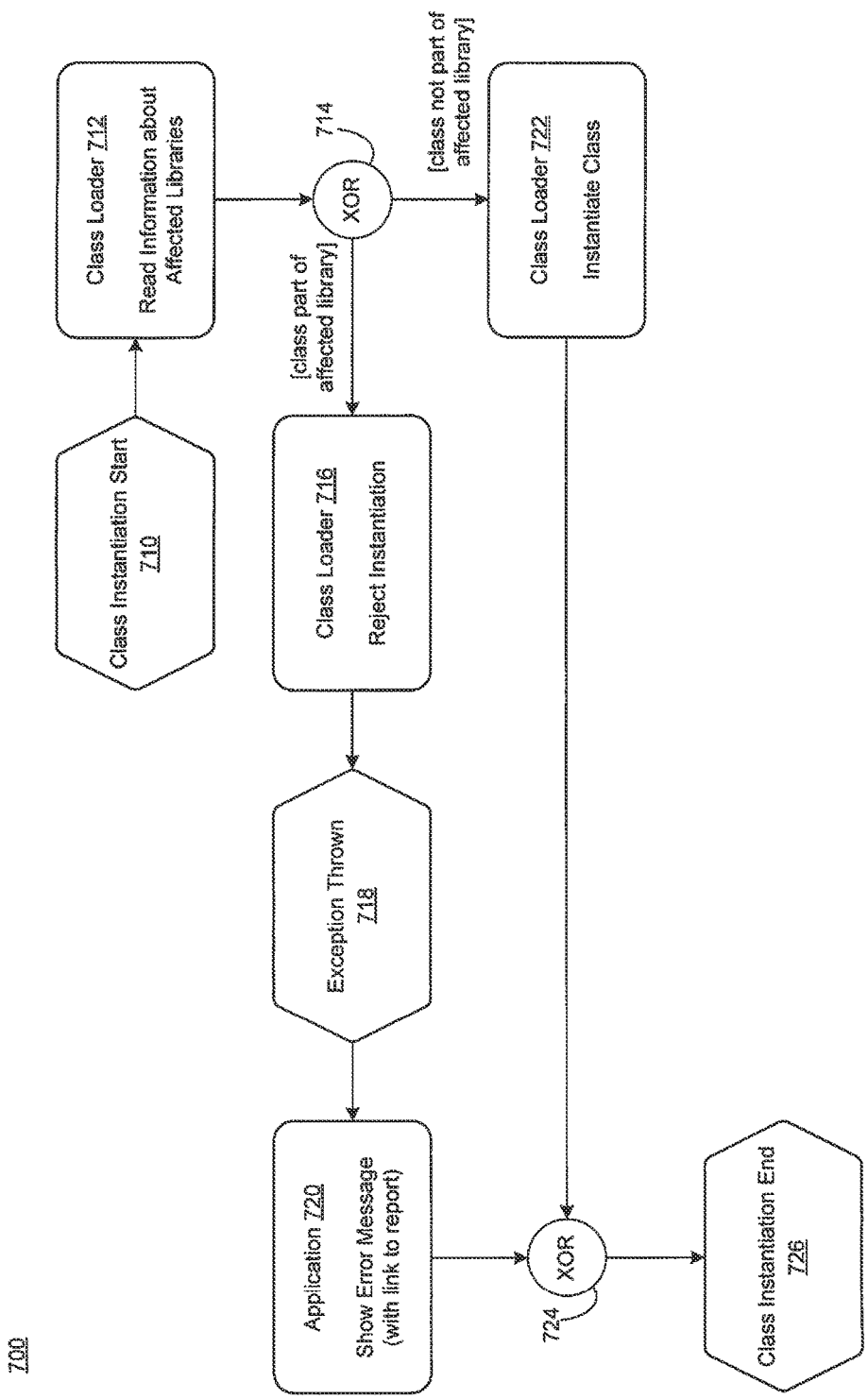

In some implementations, the flow charts of FIGS. 5-7 may refer to one or more external processes executed/performed by the check tool 420 including analyzing application archives. For instance, in some implementations, the processes described by FIGS. 5-7 may be executed by external processes that invoke at some point in time the check process implemented by the check tool 420. In other words, the external processes may be considered as examples of the client 404.

The exemplary use-cases may include a first use-case (1) that may refer to design time dependency management. In this examples use-case, a developer may be supported in avoiding dependencies on buggy or vulnerable libraries. The tool may be invoked by the client 404, and the tool may be continuously used when building new software versions. In case a constraint violation is discovered, the manifest files may be rewritten (if possible) to avoid a design-time dependency on constraint-violating components. Still, in some examples, there may be a risk that released software versions become dependent on buggy/vulnerable libraries, namely, when a vulnerability or bug is disclosed after the release of a given software version. However, this problem may be addressed by one or more of the following use-cases.

The exemplary use-cases may include a second use-case (2) that may refer to dependency management at deployment time. In this example use-case, an application container (e.g., the client 404) may perform library checks at a time when an application is deployed by an administrator. For instance, some application containers, e.g., the client 404, may be required to resolve a declared, possibly nested dependency.

If, however, an application container realizes by means of the tool that a to-be deployed application violates constraints, the application container (e.g., client 404) may react in one of several ways. For example, in case static dependencies are affected, the application container may be configured to prevent or suspend deployment and instead display a corresponding error message to a user or an administrator. In another example, in case dynamic dependencies are affected, the application container (e.g., client 404) may use reported constraint violations to resolve dynamic dependencies differently so as to avoid violations (if possible).

FIG. 5 is a block diagram illustrating an example use-case flow chart 500 that exemplifies behavior where an application container performs a check at deployment time, in accordance with aspects of the disclosure.

In the example of FIG. 5, in a use-case where static dependencies may be affected, the application container may be configured to prevent deployment and instead display a corresponding error message to the administrator. For instance, the use-case flow chart 500 may include an application deployment start 510, which may be invoked, for example, by copying a new archive in a dedicated folder, or in another example, by using an administration interface. At 512, the application container may be configured to obtain constraints from the repository 410. At 514, the container may be configured to obtain the application archive 406. At 516, the check tool 420 may be configured to analyze the application archive 406. At 518, an exclusive or (XOR) gate decision may be implemented, where a true output (1/HIGH) results if one, and only one, of the inputs to the gate is true. However, if both inputs are false (0/LOW) or both are true, a false output results. The XOR decision represents an inequality function, such that an output is true if the inputs are not alike; otherwise, the output is false. Further, at 520, if the constraints are violated, then the container rejects the application. At 522, if the constraints are met, then the container accepts the application. In some implementations, in reference to 520, more sophisticated behavior may be implemented, such as, e.g., in case of constraint violations, the application may be run in a sandbox, or with restricted privileges, or with some functionality turned off, etc. Further, at 524, another XOR gate decision may be implemented, and at 526, application deployment ends.

The exemplary use-cases may include a third use-case (3) that may refer to runtime dependency management. In this example use-case, the application user may be protected from use of buggy/vulnerable libraries. For instance, the tool may be invoked by a runtime environment, e.g., Java™ Runtime Environment, and may automatically scan an application. Different actions may be imagined in case an undesired library is found, e.g., display of a warning message to a user, termination of an application, or constrained execution of an application, e.g., in a sandbox with restricted permissions. In contrast to previous use-cases, newly created constraints may be considered at each application start, which may reduce risk for an end-user.

The following flow chart of FIG. 6 exemplifies behavior of an application runtime environment (RTE) that may be configured to check a given application after it has been started, i.e., before any application code is executed (FIG. 6). The checks performed at initialization time may then be used to determine behavior at application runtime, for example, in particular, when a class loader is asked to instantiate classes (e.g., Java™ classes) in a course of application execution (FIG. 7). In case a class is to be instantiated that belongs to a vulnerable library, the class loader (e.g., Java™ class loader) may prevent its instantiation and instead provides/throws a corresponding exception.

FIG. 6 is a block diagram illustrating an example use-case flow chart 600 that exemplifies behavior where a runtime environment (RTE) checks an application in an initialization phase, in accordance with aspects of the disclosure.

For instance, in the example of FIG. 6, the use-case flow chart 600 may include an application initialization start 610, which may be triggered, for example, by starting an application, such as a packaged application. At 612, the runtime environment (RTE) may be configured to obtain constraints from the repository 410. At 614, the RTE may be configured to obtain the application archive 406. At 616, the check tool 420 may be configured to analyze the application archive 406. At 618, a determination may be made by either the RTE of the check tool 420 as to whether one or more constraints have been violated. At 620, the RTE may store data and information about affected libraries for the class loader. At 622, application initialization ends.

FIG. 7 is a block diagram illustrating an example use-case flow chart 700 that exemplifies behavior where a class loader uses check results to allow/deny class instantiation, in accordance with aspects of the disclosure.

For instance, in the example of FIG. 7, the use-case flow chart 700 may include a class instantiation start 710. At 712, the class loader may be configured to read data and information about affected libraries. At 714, an XOR gate decision may be implemented, where at 716, if the class is determined to be part of the affected library, then the class loader may be configured to reject instantiation of the class. At 718, an exception is thrown, and at 720, the application is configured to show an error message (e.g., with a link to a report 332). Otherwise, after the XOR gate decision at 714, at 722, if the class is determined to not be part of the affected library, then the class loader may be configured to instantiate the class. Further, at 724, another XOR gate decision may be implemented, and at 726, class instantiation ends.

In this example, provided that the check tool 420 has access to an up-to-date database with library checks (for instance, a remote vulnerability database compared to a national vulnerability database (NVD)), application users may be protected from newly disclosed vulnerabilities in an automated fashion.

The exemplary use-cases may include a fourth use-case (4) that may refer to dependency management by platform providers. In reference to this example use-case, the rise of virtualization and cloud technologies detects Platform as a Service (PaaS) offerings, where an application container hosted by one organization is made available to other development organizations (e.g., smaller development organizations), that license their applications to their private customers or business customers (end-users). In some of these instances, application developers may be freed from a burden to purchase, install, and manage infrastructure required to host an application (e.g., network, hardware, and/or operating systems), all of which may be provided by a platform provider.

In this cloud context, a library check may be considered as an added value provided by a platform, which may be of interest to one or more or all of the following entities. For example, application developers using applications that may be checked at deployment time and/or on a regular basis may use successful checks for promotion purposes. In another example, platform providers may use library checks to protect the platform from critical vulnerabilities, which may refer to a need that arises from the fact that some application vulnerabilities may not only impact the application as such, but also the security of the platform, e.g., Java™ memory leaks. In another example, end-users may consult library checks before subscribing/choosing one or more given applications, which may increase assurance of end-users in security of applications. In this use-case scenario, library checks may be invoked at deployment time, at the time an end-user subscribes to an application, and/or at application runtime.

In accordance with aspects of the disclosure, the approaches/techniques described herein focus on reuse of software libraries in software applications, which may provide a fine-granular level, and may further refer to not only application runtime, but also development time. In some examples, the approaches/techniques described herein may be applied to application security. In some other examples, another application area may include using the constraints to check for adherence of component metadata (e.g., represented as properties in the declarative language) to quality guidelines.

In accordance with aspects of the disclosure, the approaches/techniques described herein provide criteria for specifying properties of "undesirable libraries" that are not encoded in a declarative language, but may be stored in some proprietary way, e.g., a product-specific database. The approaches/techniques described herein provide analysis reports may be configured to target platform providers (PaaS) or application users at application deployment or runtime. Further, the approaches/techniques described herein provide human-readable reports that allow automated processing of check results, e.g., the termination or disablement of selected application features in case the use of a vulnerable library in a given application has been discovered. The approaches/techniques described herein provide for rewriting/resolution of software dependency declarations.

In accordance with aspects of the disclosure, the approaches/techniques described herein provide manifest files describing a subset of dependencies that may exist for a given component. For instance, the approaches/techniques described herein cover static dependencies introduced by putting JAR files in dedicated folders, where Java™ manifest files may represent one of several sources of information during initialization phase. The approaches/techniques described herein provide manifest files that express constraints for use of third-party libraries, where the manifest files may represent choices made by an application developer, and also support checking choices made. Further, in another instance, the declarative language provided herein may be configured to be independent from specific programming and component models.

FIG. 8 is a process flow illustrating an example method 800 for software dependency management, in accordance with aspects of the disclosure.

In the example of FIG. 8, operations 802-808 are illustrated as discrete operations occurring in sequential order. However, it should be appreciated that, in other various implementations, two or more of the operations 802-808 may occur in a partially or completely overlapping or parallel manner, or in a nested or looped manner, or may occur in a different order than that shown. Further, additional operations, that may not be specifically shown in the example of FIG. 8, may be included in some implementations, while, in various other implementations, one or more of the operations 802-808 may be omitted. Further, in various examples, the method 800 may include a process flow for a computer-implemented method for software dependency management in the system 80 of FIG. 1. Further, as described herein, the operations 802-808 may provide a simplified operational process flow that may be enacted by the computer system 104 to provide features and functionalities as described in reference to FIG. 1.

In various aspects of the disclosure, the method 800 of FIG. 8 may be provided for managing software component dependencies for applications using declarative constraint definitions. At 802, the method 800 of FIG. 8 may include enabling specification of constraint definitions using a declarative language to analyze and detect software component dependencies on one or more libraries that meet certain criteria.

At 804, the method 800 may include identifying and checking software component dependencies on the one or more libraries that violate the constraint definitions. At 806, the method 800 may include implementing an algorithm for analyzing applications and resolving software component dependencies on the one or more libraries that violate the constraint definitions. At 808, the method 800 may include accessing a database and storing information related to the constraint definitions, the software component dependencies, and the algorithm for analyzing applications and resolving software component dependencies.

In some implementations, the method 800 may include using the declarative language to express software component dependencies and to specify constraint definitions for use of the one or more libraries including one or more software libraries. Further, the declarative language may be configured to provide for specifying declarative constraint definitions to analyze and detect software component dependencies on one or more libraries that meet certain criteria.

In some implementations, the method 800 may include using the declarative language to analyze and detect software component dependencies on one or more libraries that meet certain criteria including a library having licensed library components. Further, in some implementations, the method 800 may include using the declarative language to analyze and detect software component dependencies on one or more libraries that meet certain criteria including a library of a specific version having licensed library components. Still further, in some implementations, identification of one or more or all component dependencies may be performed, and then a check may be performed to determine whether one or more or any of them violate constraints or not.

In some implementations, the method 800 may include using the declarative language to analyze and detect software component dependencies on one or more libraries that meet certain criteria including a library having a specific digest that does not correspond to its original digest communicated by its original vendor. Further, in some implementations, the method 800 may include processing and correcting one or more of the software component dependencies on the one or more libraries that violate the constraint definitions. Still further, in some implementations, the method 800 may include identifying and checking software component dependencies in an iterative manner, check for violation of constraint definitions, and/or propose corrections to dependency declarations.

In some implementations, the method 800 may include implementing a software tool having an architecture that may be configured to implement the process and/or the algorithm. Further, in some implementations, the architecture for the software tool may be configured to implement the algorithm to check the applications for specific use-cases in which software components are presented without prescribing at least one of their implementation technologies, communication protocols, and/or distribution.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
   a conflict resolution manager configured to cause the at least one processor to manage software component dependencies for applications using declarative constraint definitions, the conflict resolution manager including,
      a component analyzer configured to analyze and detect direct and transitive software component dependencies on one or more libraries;
      a constraint checker configured to enable specification of constraint definitions in a declarative language, and to identify and check software component dependencies for one or more libraries that violate the constraint definitions including accessing at least one database with stored vulnerability data and comparing the one or more libraries to the vulnerability data to identify, in a manifest file, one or more violations of the constraint definitions;
      an optimizer configured to implement an algorithm for, analyzing applications and resolving software component dependencies on the one or more libraries that violate the constraint definition, wherein resolving software component dependencies includes, generating a plurality of dependency expressions using the declarative language, iteratively determining a subset of the plurality of dependency expressions that satisfy the constraint definitions, and rewriting the manifest file to omit one or more libraries that violate the subset of the plurality of dependency expressions, the manifest file being rewritten in response to determining at least one software component violates at least one constraint declared in the manifest file, wherein rewriting the manifest file further includes determining a plurality of libraries that are unused by the at least one software component and removing the plurality of libraries that are unused from the manifest file; and
      a storage handler configured to access a database and store information related to the constraint definitions, the software component dependencies, and the algorithm for analyzing applications and resolving software component dependencies.

2. The system of claim 1, wherein the component analyzer is configured to use the declarative language to specify constraint definitions for use of the one or more libraries including one or more software libraries.

3. The system of claim 1, wherein the declarative language provides for specifying declarative constraint definitions to analyze and detect software component dependencies on one or more libraries that meet certain criteria, whereby the certain criteria are applied to properties of respective libraries and to a manner in which multiple libraries are composed within a given application.

4. The system of claim 1, wherein the component analyzer is configured to use the declarative language to analyze and detect software component dependencies on one or more libraries that meet certain criteria including one or more of being published under a certain license, a library of a specific version having licensed library components, and a library having a specific digest that does not correspond to its original digest communicated by its original vendor.

5. The system of claim 1, wherein the constraint checker is configured to identify and check software component dependencies in an iterative manner, check for violation of constraint definitions, and propose corrections to dependency declarations.

6. The system of claim 1, wherein the optimizer is configured to implement a software tool having an architecture that is configured to implement the algorithm to check the applications for specific use-cases in which software components are presented without prescribing at least one of their implementation technologies, communication protocols, and distribution.

7. The system of claim 1, wherein the conflict resolution manager is configured to cause the at least one processor to manage software component dependencies for deployment of the applications, where:
   in case of static dependency violations, deployment of the applications is suspended, and an error message is displayed to a user, and
   in case of dynamic dependency violations, reported constraint violations are used to resolve dynamic dependencies to avoid violations.

8. The system of claim 1, wherein the conflict resolution manager is configured to cause the at least one processor to manage software component dependencies for protecting the applications in a run-time environment, wherein the applications are scanned for run-time dependencies on software components that violate the constraint definitions, and
   in case of run-time dependency violations, one or more actions are performed including one or more of displaying a warning message to a user, termination of the applications, and constrained execution of the applications.

9. The system of claim 1, wherein the conflict resolution manager is configured to cause the at least one processor to manage software component dependencies for licensing the applications, wherein library checks including software dependency checks are performed at one or more of deployment time, application run-time, and a time a user subscribes to at least one of the applications.

10. A computer program product, the computer program product tangibly embodied on a non-transitory computer-readable storage medium and including instructions that, when executed by at least one processor, are configured to:
manage software component dependencies for applications using declarative constraint definitions, including instructions configured to,
enable specification of constraint definitions using a declarative language to analyze and detect software component dependencies on one or more libraries that meet certain criteria;
identify and check software component dependencies for one or more libraries that violate the constraint definitions including accessing at least one database with stored vulnerability data and comparing the one or more libraries to the vulnerability data to identify, in a manifest file, one or more violations of the constraint definitions;
implement an algorithm for analyzing applications and resolving software component dependencies on the one or more libraries that violate the constraint definitions, wherein resolving software component dependencies includes, generating a plurality of dependency expressions using the declarative language, iteratively determining a subset of the plurality of dependency expressions that satisfy the constraint definitions, and rewriting the manifest file to omit one or more libraries that violate the subset of the plurality of dependency expressions, the manifest file being rewritten in response to determining at least one software component violates at least one constraint declared in the manifest file, wherein rewriting the manifest file further includes determining a plurality of libraries that are unused by the at least one software component and removing the plurality of libraries that are unused from the manifest file; and
access a database and store information related to the constraint definitions, the software component dependencies, and the algorithm for analyzing applications and resolving software component dependencies.

11. The computer program product of claim 10, the instructions further configured to:
use the declarative language to express software component dependencies and to specify constraint definitions for use of the one or more libraries including one or more software libraries.

12. The computer program product of claim 10, wherein the declarative language provides for specifying declarative constraint definitions to analyze and detect software component dependencies on one or more libraries that meet certain criteria.

13. The computer program product of claim 10, the instructions further configured to:
process and correct one or more of the software component dependencies on the one or more libraries that violate the constraint definitions including:
identifying and checking software component dependencies in an iterative manner;
checking for violation of constraint definitions; and
proposing corrections to dependency declarations.

14. The computer program product of claim 10, the instructions further configured to:
implement a software tool having an architecture that is configured to implement the algorithm, the architecture being configured to implement the algorithm to check the applications for specific use-cases in which software components are presented without prescribing at least one of their implementation technologies, communication protocols, and distribution.

15. A computer-implemented method, comprising:
managing software component dependencies for applications using declarative constraint definitions, including,
enabling specification of constraint definitions using a declarative language to analyze and detect software component dependencies on one or more libraries that meet certain criteria;
identifying and checking software component dependencies for one or more libraries that violate the constraint definitions including accessing at least one database with stored vulnerability data and comparing the one or more libraries to the vulnerability data to identify, in a manifest file, one or more violations of the constraint definitions;
implementing an algorithm for analyzing applications and resolving software component dependencies on the one or more libraries that violate the constraint definitions, wherein resolving software component dependencies includes, generating a plurality of dependency expressions using the declarative language, iteratively determining a subset of the plurality of dependency expressions that satisfy the constraint definitions, and rewriting the manifest file to omit one or more libraries that violate the subset of the plurality of dependency expressions, the manifest file being rewritten in response to determining at least one software component violates at least one constraint declared in the manifest file, wherein rewriting the manifest file further includes determining a plurality of libraries that are unused by the at least one software component and removing the plurality of libraries that are unused from the manifest file; and
accessing a database and storing information related to the constraint definitions, the software component dependencies, and the algorithm for analyzing applications and resolving software component dependencies.

16. The method of claim 15, further comprising:
using the declarative language to express software component dependencies and to specify constraint definitions for use of the one or more libraries including one or more software libraries.

17. The method of claim 15, wherein:
the declarative language provides for specifying declarative constraint definitions to analyze and detect software component dependencies on one or more libraries that meet certain criteria.

18. The method of claim 15, further comprising:
processing and correcting one or more of the software component dependencies on the one or more libraries that violate the constraint definitions;
identifying and checking software component dependencies in an iterative manner;
checking for violation of constraint definitions; and
proposing corrections to dependency declarations.

19. The method of claim 15, further comprising:
implementing a software tool having an architecture that is configured to implement the algorithm, the architecture being configured to implement the algorithm to check the applications for specific use-cases in which software components are presented without prescribing at least one of their implementation technologies, communication protocols, and distribution.

* * * * *